No. 639,021. Patented Dec. 12, 1899.
W. H. COON.
EXPANSIVE TREE PROTECTOR.
(Application filed June 15, 1899.)
(No Model.)

Witnesses
Charles Van Voorhis
Jesse S. Lee

Inventor
Willis H. Coon,
By Geo. B. Selden,
Attorney

UNITED STATES PATENT OFFICE.

WILLIS H. COON, OF ROCHESTER, NEW YORK, ASSIGNOR, BY DIRECT AND MESNE ASSIGNMENTS, TO THE EXPANSIVE TREE PROTECTOR COMPANY, OF NEW YORK.

EXPANSIVE TREE-PROTECTOR.

SPECIFICATION forming part of Letters Patent No. 639,021, dated December 12, 1899.

Application filed June 15, 1899. Serial No. 720,622. (No model.)

*To all whom it may concern:*

Be it known that I, WILLIS H. COON, a citizen of the United States, residing at Rochester, New York, have invented an Improved Expansive Tree-Protector, of which the following is a specification, reference being had to the accompanying drawings.

My invention relates to an improved expansive tree-protector, which is fully described and illustrated in the following specification and the accompanying drawings, the novel features thereof being specified in the claims annexed to the said specification.

Figure 1:
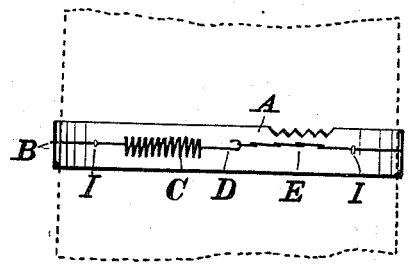
Figure 2:
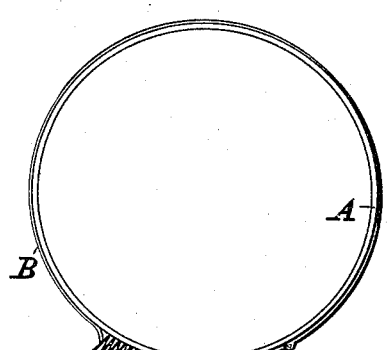
Figure 5:
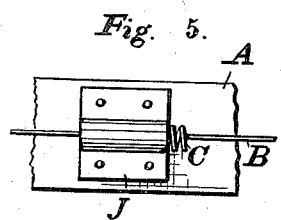
Figure 3:
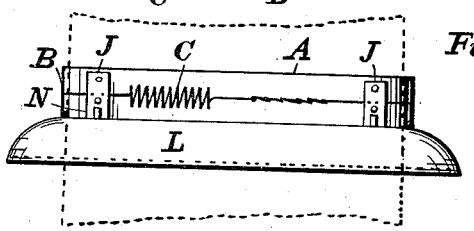
Figure 6:
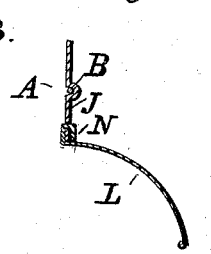
Figure 4:
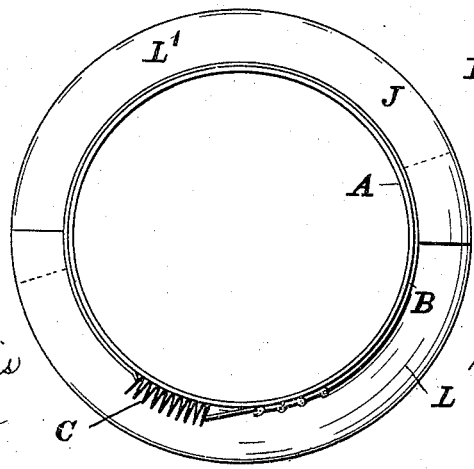

In the accompanying drawings, representing my improved expansive tree-protector, Figure 1 is a side view. Fig. 2 is a plan view. Fig. 3 is a side view showing the apron attached. Fig. 4 is a plan view of the same. Fig. 5 represents a modification. Fig. 6 represents the method of attaching the apron to the band.

In the production of my improved tree-protector I provide a band A, of any suitable absorptive textile material, of suitable dimensions, and along one side of it I arrange an elastic or expansible belt B, attached to the band at one or more points in any suitable way. In the construction which I prefer I make the band A of thick felt, of suitable width, and of a length sufficient to go around the tree to be protected, and I form the belt B of wire, with a spiral spring C in its length, by which I secure the expansibility necessary to permit the growth of the tree. The belt extends all the way around the outside of the band and serves to hold it in place on the tree. The ends of the belt are fastened together in any suitable way, as by twisting, or preferably by providing one end with a hook D, which may be engaged in any one of a series of rings or loops E, formed in the wire. The edges of the band may be straight or serrated, as shown in Fig. 1. The belt may be attached to the band by one or more staples I or by the clips J, which may be made of metal. These clips are riveted or otherwise secured to the band, and the belt passes inside of them, being free to slide lengthwise.

The apron L may be attached to the band, being made of a form projecting outward from the tree, so as to prevent worms or insects from crawling up the bark. This apron is made of sheet metal divided at one or more points, so as to form one or two sections L and L', Fig. 4, with overlapping ends. The section or sections are attached to the band in any suitable way—such, for instance, as the ears N, which are inserted into openings in the clips J and bent over, as indicated in Fig. 6.

In a modification represented in Fig. 5 the spring C is more or less entirely concealed in an outwardly-projecting bend in the clip J.

The absorptive band is more or less completely saturated with any chemical substance destructive or noxious to worms, insects, &c. The under side of the apron may be coated with any suitable sticky or adhesive material to prevent anything crawling beyond it. It will be understood that the band may be employed without the apron.

My improved tree-protector is cheap, durable, easy to apply or renew, does not injure the trees, as it can expand with their growth, and effectually prevents insects, &c., from getting at the foliage.

I claim—

1. The combination, in a tree-protector, of the band of absorptive textile material, the expansible belt surrounding the band and secured thereto, and the flexible divided sheet-metal apron attached to the band, as and for the purposes set forth.

2. The combination with the band of absorptive textile material, provided with the perforated clips, of the outer expansible belt, and the apron having ears adapted to engage with the clips, as and for the purposes set forth.

WILLIS H. COON.

Witnesses:
JESSE S. LEE,
GEO. B. SELDEN.